March 13, 1951     L. K. DAVIS     2,545,264
WARPABLE FRAME ACTUATING DEVICE FOR USE WITH
ELECTRIC SWITCHES AND THE LIKE
Filed July 3, 1947     3 Sheets-Sheet 1
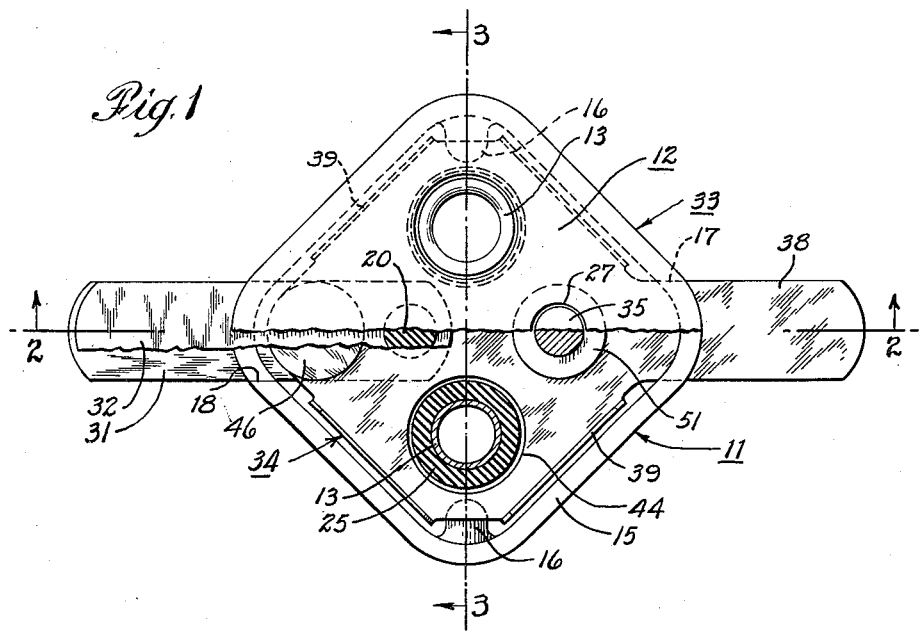
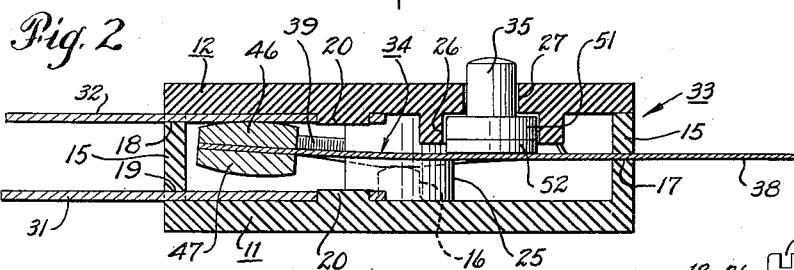
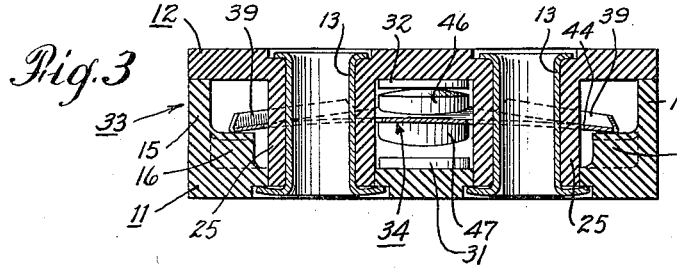
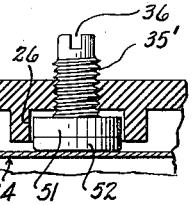
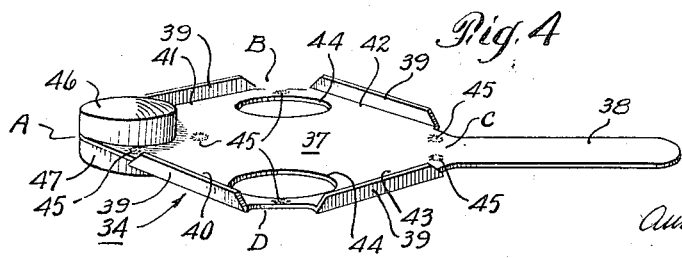
INVENTOR
Lincoln K. Davis,
BY
Austin, Wilhelm & Carlson
ATTORNEYS.

March 13, 1951 L. K. DAVIS 2,545,264
WARPABLE FRAME ACTUATING DEVICE FOR USE WITH
ELECTRIC SWITCHES AND THE LIKE
Filed July 3, 1947 3 Sheets-Sheet 2

INVENTOR
Lincoln K. Davis
BY
Austin, Wilhelm & Carlson
ATTORNEYS

March 13, 1951 L. K. DAVIS 2,545,264
WARPABLE FRAME ACTUATING DEVICE FOR USE WITH
ELECTRIC SWITCHES AND THE LIKE
Filed July 3, 1947 3 Sheets-Sheet 3
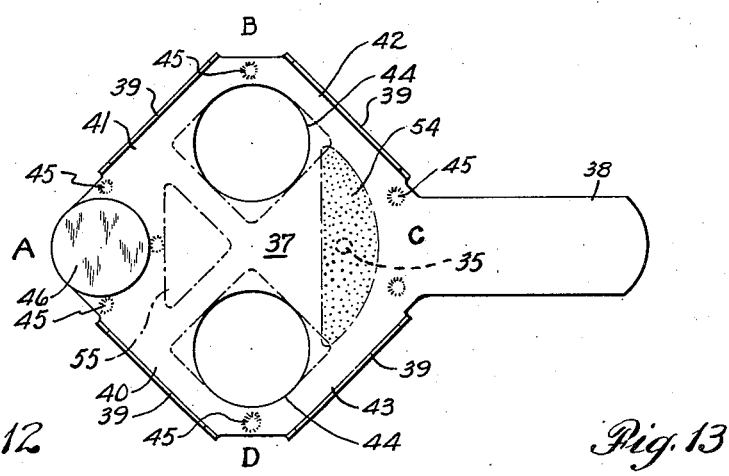
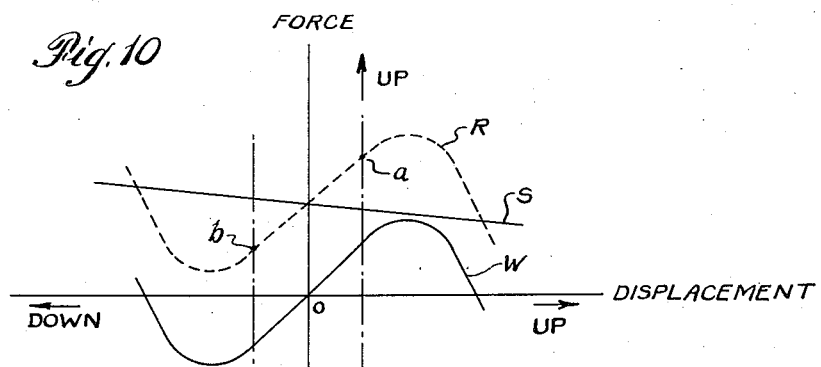
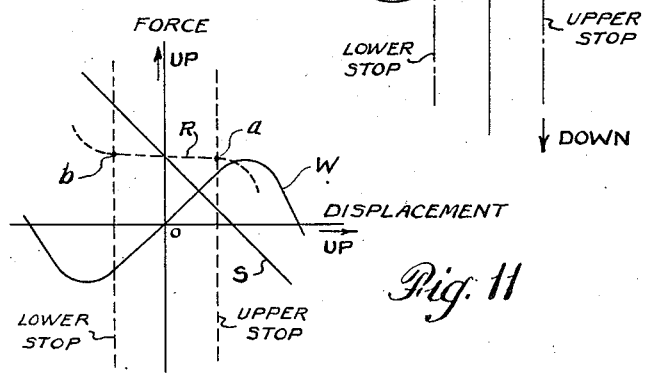
INVENTOR
Lincoln K. Davis
BY
Austin, Wilhelm + Carlson
ATTORNEYS.

Patented Mar. 13, 1951

2,545,264

UNITED STATES PATENT OFFICE 2,545,264

WARPABLE FRAME ACTUATING DEVICE FOR USE WITH ELECTRIC SWITCHES AND THE LIKE

Lincoln K. Davis, Brockton, Mass.

Application July 3, 1947, Serial No. 758,854

11 Claims. (Cl. 200—67)

The invention relates to movement-producing devices and more particularly to devices for converting a motion having given characteristics to a motion having entirely different characteristics.

The invention, in one preferred form, is based upon the use of a warpable frame element such as disclosed and claimed in my Patent No. 2,166,238, dated July 18, 1939. This patent discloses a quadrilateral frame having relatively stiff sides and flexible corners, the interior of the frame being under tension to cause the initially flat frame to warp into the form substantially of a hyperbolic paraboloid. I have found that, by applying an actuator at the proper point on such a frame member, the frame member will partake of a movement from a position of curvature on the one side of flatness against a back stop to a position of curvature on the other side of flatness against a forward stop. By proper location of the actuator, I can give the frame snap action or slow creeping action according to the location of the actuator. I can also obtain relatively large displacement of the frame member from relatively small displacement of the actuator, in many cases a great multiplication of movement.

The frame may be biased, that is, have a single stable position against its back stop and be operable by a single actuator to engage its forward stop. Or, the frame may have two stable positions, one against its back stop and one against its front stop, in which case two actuators may be used. The biasing may be accomplished either by stressing the metal of the frame or by using a separate biasing spring.

The invention is particularly applicable to electric switches, sometimes called microswitches, and the actuator may conveniently be a pushbutton.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 is a plan view of a single pushbutton switch embodying the principles of the invention;

Figs. 2 and 3 are sections on the lines 2—2 and 3—3 respectively of Fig. 1;

Fig. 2a is a detail section illustrating a modified form of actuator;

Fig. 4 is a perspective of the framelike movable element;

Fig. 9 is a diagram illustrating effects of certain critical areas on the framelike element;

Figs. 10 and 11 represent graphs illustrating the operation of the switch;

Fig. 12 is a detail illustrating a step in the preferred method of stretching the frame; and Fig. 13 is a detail illustrating another method of stretching the frame.

Figure 5:
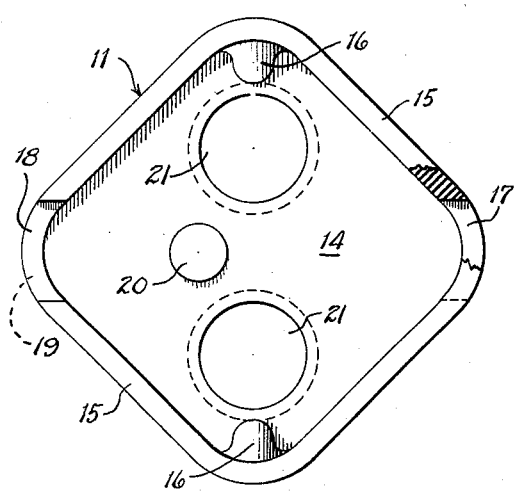
Fig. 5 is a plan view of the bottom of the switch case with cover removed.
Figure 6:
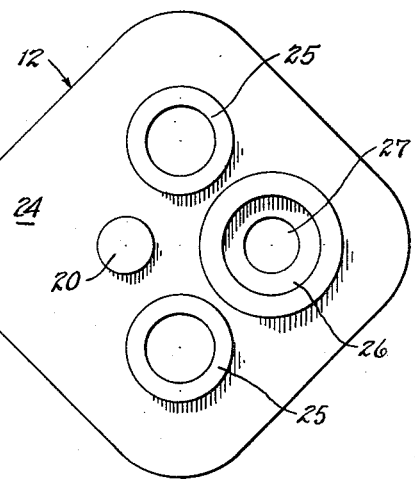
Fig. 6 is a plan view of the cover of the case looking at the bottom side of the cover.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Figs. 1 to 6, the structure of the single pushbutton type of switch will first be described. The structure is shown greatly enlarged for sake of clarity. This form may also be referred to as the biased form in that the movable framelike element (sometimes referred to as the hypar or blade element) is biased so as to normally take a position against its upper or back contacts.

The construction comprises, briefly, a case 33 housing the hypar element 34 having a normal position against its back or top contact 32 and being movable against its forward or bottom contact 31 by pressing pushbutton 35.

The case 33 comprises a base 11 with removable cover 12, the parts being held together by eyelets 13 passing through the case and permitting the use of suitable screws or other means of attachment to an associated structure.

The base 11 (Fig. 5) may be made of suitable molded insulating material, and comprises a bottom 14 and an upstanding quadrilateral wall 15 having fulcrum abutments 16 with rounded tops to afford rolling contact to the corners of the hypar element 34. The wall 15 has a slot 17 to pass the tail 38 of the hypar element 34. The wall 15 has another slot 19, at its bottom (Fig. 2), for forward contact strip 31. Wall 15 has an open slot 18 at its top for back contact strip 32. These strips 31 and 32 have holes through which pass short bosses 20 integral with the case, it being the intent to stake the top strip 32 to the cover 12 and the bottom strip 31 to the base 11. The base 11 also has holes 21 for a purpose hereinafter described.

The cover 12 (Fig. 6) comprises a top plate 24 with integral depending tubes 25 adapted to pass through the holes 21 in the base when the case is assembled. Cover 12 also has a pushbutton well 26 and a hole 27 through which pushbutton 35 passes; the pushbutton has an enlarged flange 51. In cases where the pushbutton 35 is of metal, an insulating disc 52 may be inserted between the flange 51 and the hypar element 34, being retained by well 26.

Referring now to Fig 4, the hypar or blade 34 comprises a flat metal plate or body member 37 having an integral tail 38 and integral upturned side flanges 39 to form relatively stiff frame sides 40, 41, 42, 43. The side flanges 39 are omitted at the corners A, B, C, D of the hypar to make it flexible at the four corners thereof. The free corner of the hypar carries electric contacts 46 and 47 suitably secured thereto as by riveting or welding.

The hypar is made from initially plane sheet metal having a sufficient temper to resist straining. The hypar is provided with holes 44 for manufacturing and mounting convenience and to increase flexibility. The flexible corners are stretched, as by first forming dimples in the metal and then flattening them, or by hammering with a peening hammer, at the corners, as indicated diagrammatically by 45. This stretching of the corners acts to effectively elongate the periphery of the blade with respect to its interior, putting the relatively stiff sides 40, 41, 42, 43 under compression and the interior of the blade under tension. This causes the resulting structure to be unstable when flat and to take a stable position on either side of flatness depending upon which position it is moved by external forces. At this stage the hypar element thus has two positions of stability.

The methods of stretching the frame at the corners will be briefly described.

Figure 12 is a section through a corner and illustrates the appearance of the corner after forming the dimple. As indicated, this dimpling operation offsets the thin metal of the blade, forming a depression on one side of the blade and a protuberance on the other side of the blade. The dimple constitutes a locally stretched area. The subsequent flattening of the dimple compresses the stretched metal of the dimple and stretches the metal immediately surrounding the dimple, thus effectively stretching the corner of the hypar.

Figure 13 illustrates an alternative method of stretching the corner. This figure illustrates the appearance of the corner after peening one surface of the hypar. This peening operation causes the metal to flow, making the corner thinner and spreading the metal, thus in effect stretching the corner.

After stretching the corners, the hypar element is then deformed to stress the metal at the corners beyond its elastic limit to give the hypar a bias or permanent set on one side of flatness. This is done by bending the metal oppositely about the diagonals AC and DB (see Fig. 8) to take a biased or set position corresponding to the upper position A'BCD in Fig. 8. Diagonal A'C is then concave upward and diagonal BD is concave downward.

The manner of stressing the hypar element and its method of operation will be described more in detail hereinafter.

The hypar element is assembled as shown with its tail 38 passing through slot 17 and with its lateral corners BD resting upon fulcrum pieces 16, after which the cover 12 with pushbutton 35 in position is placed on body 11 and the two secured by eyelets 13. The hypar element 34 being given a permanent set on one side of flatness, it normally takes its single stable position on one side of flatness against the upper or back contact 32 in Fig. 2. Thus in order to disengage back contact 32 and engage front contact 31, the pushbutton 35 must be pressed. The several tongues 31, 32 and 38 provided terminals to connect the switch in circuit.

Figure 8:
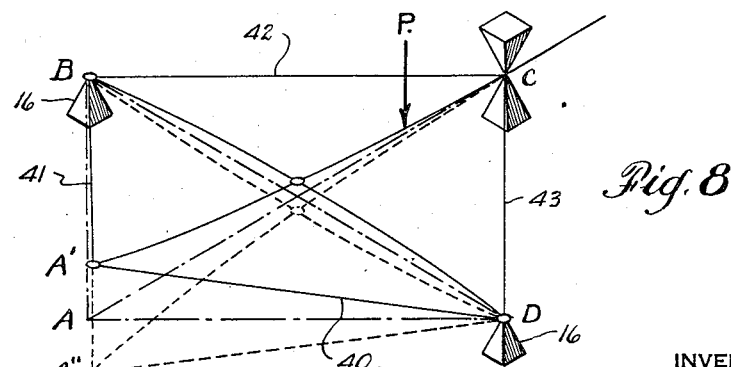
Fig. 8 is a diagram illustrating the manner in which the frame warps.

To obtain a better understanding of the nature of the hypar element 34, attention is called to Fig. 8 which illustrates diagrammatically the hypar element having stiff sides 40, 41, 42 and 43 with flexible corners A, B, C and D. Corners B, C and D are anchored in fixed position, leaving corner A free to move. The position A denotes position of flatness. Position A' denotes upper warped position and the position A'' denotes lower warped position.

It will be noted that the diagonals B, D and A, C take anticlassic positions when the sheet assumes either upper or lower warped position. In upper position the diagonal B, D is convex upwardly and the diagonal A'C is concave upwardly. In lower warped position the diagonal B, D is concave upwardly and the diagonal A''C is convex upwardly.

Regardless of flat or warped positions, the sides remain straight while the diagonals take the curved positions indicated. The surfaces described by the sheet body of the blade in its warped positions are substantially hyperbolic paraboloids.

Assuming the hypar element is biased to have a single upward stable position as in the single pushbutton type shown in Figs. 1 to 6, I have found that by placing the pushbutton at some position indicated by the arrow P, the switch can be thrown without any contact creep, either at back contacts 32 or front contacts 31. That is to say, when pushbutton 35 is depressed, there will be a quick break at 32 and a quick make at 31. In other words, the pressure of the pushbutton against the hypar elements builds up sufficient stress in the metal to cause this complete action of quick breaking and quick making after the pushbutton is pressed to a given position. Similarly, when the pushbutton is released, there is a quick break at the lower contact 31 and a quick make at the upper contact 32.

Thus snap action is obtained in the sense that, before any movement of the movable contact takes place, conditions are obtained which insure completion of a snap movement without creep either in breaking or in making contact.

The action of the single pushbutton type will be better understood from a consideration of Fig. 10 which discloses simplified curves illustrating the characteristics of the hypar element. These curves show the force exerted by the free corner of the hypar element plotted as a function of its displacement, the origin, where the force and displacement axes cross, being indicated by O. Assuming the switch to be in the position shown in Fig. 2 with the blade 34 horizontal, any forces generated by the hypar element directed upwardly are plotted above the displacement axis and upward displacements from flatness are plotted to the right of the force axis.

The curve W represents the movement of the free corner of the hypar element assuming the corners stretched but without being set or biased. In other words, this curve represents the action of the hypar element unbiased as used in the two pushbutton switch shown in Fig. 7 (described below). It will be noted that, when the hypar has a position of flatness, equidistant between the lines indicating the upper and lower stops, its displacement is zero and it exerts no force, either upwardly or downwardly. As the free corner moves upwardly, it exerts an upward force, such force increasing with increasing displacement to a certain maximum value after which the force again decreases. Similarly, when the free corner is displaced downwardly from mid-position or position of flatness, the hypar element exerts a downward force. The downward force has the same characteristics as the upward force but in an opposite direction. Only the approximately straight part of the curve between the upper and lower stops is used. The curve W represents "over-centering action" in that in the flat position the hypar is unstable and any displacement therefrom in either direction sets up forces increasing its displacement.

The curve S represents inherent "spring action" of the material of which the hypar is made. Due to the set or bias it will be seen that the entire curve S is above the displacement axis, showing that this bias sets up an upward force throughout the entire working distance between upper and lower stops. It will furthermore be noted that the line S is a straight line and that there is a gradual build-up as the free corner is displaced from upper stop to lower stop.

The curve R represents the sum of the curves S and W and represents the resultant of the forces exerted by the biased single pushbutton type hypar element. It will be noted that this force exerts considerable upward pressure against the upper contact.

When the pushbutton 35 is pressed, this operation changes the position of curve S, moving it bodily downwardly. This also moves R downwardly. When the point $a$ crosses the displacement axis, the force at the upper stop suddenly becomes downward and the free corner of the hypar element snaps down against the lower stop, assuming that pressure is maintained upon the pushbutton. When pressure on the pushbutton is removed, curve R moves upwardly and, when point $b$ crosses the displacement axis, the force at the lower stop suddenly becomes upward and the free corner of the hypar element snaps up against the upper stop.

Instead of a pushbutton actuator 35, a screw threaded actuator 35', as illustrated in Fig. 2a, may be used. In this case the shank of the actuator 35' is screw threaded to the cover 12 and is provided with a slot 36 to receive a member (not shown) for rotating the actuator; the construction is otherwise the same as in Fig. 2. Rotation of the actuator 35' moves it toward or away from the hypar blade, actuating the hypar in the same manner as the pushbutton 35.

Tests show that changes may be made in the construction without departing from the teachings of the invention. For example, the position of the pushbutton 35 may be changed somewhat with respect to the hypar element 34. For quick snap action, the best place to locate the pushbutton appears to be at a point removed from free corner A a distance equal to about two-thirds of the distance therefrom to the fixed support at the diagonally opposite corner C. If the pushbutton be placed too far toward the diametrically opposite fixed corner C, the force required to snap the switch is excessive.

Referring to Fig. 9, the pushbutton 35 may be located anywhere within the shaded region 54 for snap action. At the forward border of the zone snap action ceases and the hypar acts limp. The rear border (adjacent fixed corner C) of this zone is not so definite but is determined by the line beyond which a push will strain the metal beyond its elastic limit.

Further tests show that, when the pushbutton 35 is placed near the forward edge (toward the free corner) of the snap action zone, a very slight movement of the pushbutton will produce a large displacement of the free corner. If the pressure be applied inside the snap zone 54, snap action will be obtained. If the pushbutton pressure be applied outside the snap zone 54 toward the free corner A, the motion of the free corner will be slow.

In the critical region near the forward edge of the snap action zone, great multiplication ratios have been obtained, but the action is inclined to be lazy, or a slow snap bordering on slow motion. This feature of high motion multiplication is useful in cases requiring large displacement of the free corner with minute displacement of an actuator, where snap action is not particularly important.

The reason for the slow motion, high displacement-multiplication action will be apparent from a consideration of the curves in Fig. 11. The location of the actuator near the free corner stiffens the inherent spring action so that the curve S in Fig. 11 has a greater slope than in Fig. 10. This causes the straight part of curve R to be more nearly horizontal and to slope gently downward to the right in Fig. 11. Continued pressure on the pushbutton moves curve S downwardly parallel to itself, together with curve R. When the point $a$ reaches the displacement axis, the pressure of the free corner against the upper contact becomes downward, but no snap action occurs since curve R slopes upward to the left indicating that downward pressure does not increase with downward displacement of the free corner. The curve R being nearly parallel to the displacement axis, the hypar acts limp, i. e. small force applied to the pushbutton will move the free corner through a substantial distance. Since a small force corresponds to a small movement of the pushbutton, a displacement-multiplication corresponding to the cotangent of the slope of the straight portion of R is theoretically obtainable.

Some idea of the displacement magnifying characteristics may be obtained from Fig. 8, bearing in mind that this figure represents a type of isometric drawing primarily to illustrate the reversal of curvature of the diagonals and that the displacements of the several parts are not to scale. Tests have shown possible practical displacement magnifications of about 300 to one, and thus far in excess of that which the proportions illustrated in Fig. 8 might indicate.

It will be noted that, with the free corner in its A' position, the diagonal BD is bowed upwardly while the diagonal A'C is bowed downwardly, the effect of the latter, because of the anchorage of corner C, being to increase the displacement of free corner A' over and above the displacement which would occur if diagonal A'C remained a straight line. Thus the simultaneous curving of the two diagonals in opposite directions serves to increase the displacement of free corner A. Furthermore, it will be noted that the diagonals A'C and A''C are both convex with respect to the central flat position represented by AC. This reduces the displacement of actuator points located near P.

The position of the holes 44 may be changed and their shape may be altered to that indicated in Fig. 9. Also, an additional hole may be placed as indicated by 55. The main requirement is to avoid interference with the tension of the inner portion 37 tending to pull opposite sides of the hypar together. Holes may be omitted entirely, if desired. Holes have the advantage of increasing flexibility of the hypar and they also facilitate manufacture of the hypar by isolating the corners to be worked from the center of the plate.

Also, instead of putting a biasing set in the metal of the hypar element, the element may be stressed symmetrically and an external spring (not shown) may be used to add the characteristics of the line S in Fig. 10.

Also, if desired, for drawing in the opposite sides, the side corners B, D only of the frame may be stretched, this operation being omitted at the free corner A and at the diametrically opposite fixed corner C.

It will be understood that the exact interaction of forces in the hypar element is complicated and that the above explanation is given to help in understanding the operation of the invention, and is believed to be approximately correct. However, regardless of theory, the switch, when built in accordance with the teachings given herein, operates as described.

Figure 7:
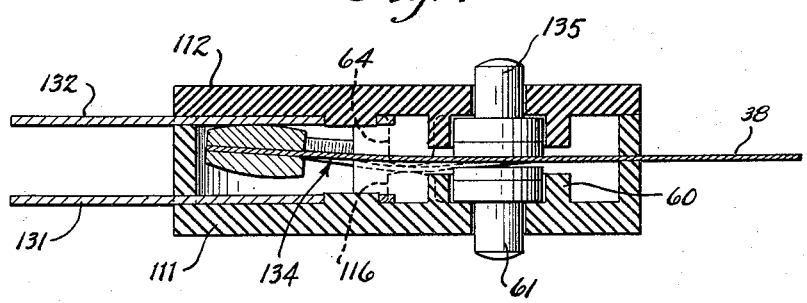
Fig. 7 is a section corresponding to Fig. 2 but illustrating a two pushbutton type of switch.

Referring now to Fig. 7, the modified two-pushbutton, unbiased type will be described. Here base 111 is very much like base 11 except that it is provided with a tubular projection 60 for the second pushbutton 61.

Cover 112 is similar to cover 12 and pushbutton 135 is mounted in a manner similar to that of pushbutton 35. The hypar element 134 has a structure similar to the hypar element 34 except that it is not biased—only edge-stretched, giving two stable positions. Cover 112 has depending fulcrum pieces 64 disposed opposite the fulcrum pieces 116 on the base, the latter being similar to the fulcrum pieces 16 in Figs. 1 to 6. The hypar element 134 is held between these fulcrum pieces, not clamped, but without sensible lost motion.

It will be understood that because of the unbiased or symmetrical stressing of the hypar 134 in Fig. 7, it is necessary to have fulcrum pieces 64 and 116 on both faces of the hypar element, while because of the biased condition of the hypar element 34 in Fig. 2, it is necessary to have fulcrum pieces 16 only at the bottom side of the hypar element 34.

The manner of assembling the parts in Fig. 7 will be obvious from the structure, the hypar element 134 being shown in its upper position against upper contact 132. To push the hypar element against lower contact 131, top pushbutton 135 is pressed, the hypar element then snapping to lower position where it remains against the contact 131 in stable position. To move the hypar element against the upper contact 132 from its lower stable position, the lower pushbutton 61 is pressed and the hypar element snaps to its upper stable position against upper contact 132.

Thus practice of the invention gives fast snap action, or slow motion with large movement multiplication, depending upon design. The advantages of snap action giving quick make and quick break on both forward and back contacts increases the current carrying capacity of the switch and gives it long life. The high motion multiplication is advantageous in many instrumental and other uses. The switch may be either of the single or double pushbutton type and either type may have only back contacts, only front contacts, or both back and front contacts. In all cases snap action (no creep) may be obtained at both make and break and at both front and back contacts.

The free corner may operate output devices other than electric switches and actuators other than hand-operated pushbuttons may be used.

While certain novel features of the invention have been disclosed herein, and are pointed out in the annexed claims, it will be understood that various omissions, substitutions and changes may be made by those skilled in the art without departing from the spirit of the invention.

What is claimed is:

1. In an actuating device, a support, a quadrilateral frame having comparatively stiff sides articulately connected at the corners of the frame, means for urging opposite sides together to cause said frame to tend to warp out of flatness, means on said support for anchoring said frame leaving a corner free to move from one position to another, and an actuating device for applying a force, generally perpendicular to said frame, to cause said free corner to move from said one position to another.

2. In an actuating device, a support, a blade comprising a quadrilateral frame having comparatively stiff sides articulately connected at the corners of the frame and an interior body urging opposite sides together to cause said frame to tend to warp out of flatness, means on said support for anchoring three corners of said frame leaving the fourth corner free, an actuating device mounted on said support for movement generally perpendicular to said frame against a limited area of said body between the sides connecting the three anchored corners, and front and back stops mounted on said support adapted to be engaged by said free corner.

3. In an actuating device, a support, a quadrilateral frame having comparatively stiff sides articulately connected at the corners of the frame, means for urging opposite sides together to cause said frame to tend to warp out of flatness, means on said support for anchoring three corners of said frame leaving the fourth corner free, front and back fixed stops mounted on said support adapted to be engaged by said free corner, means for applying a biasing force to said frame to cause it normally to engage the back stop, and an actuating device for applying a force, generally perpendicular to said frame, at a limited area of said frame between the sides connecting the three anchored corners to cause said free corner to disengage said back stop and engage said front stop with a snap movement.

4. In an actuating device, a support, a quadrilateral frame having comparatively stiff sides articulately connected at the corners of the frame, means for urging opposite sides together to cause said frame to tend to warp out of flatness, means on said support for anchoring three corners of said frame leaving the fourth corner free, front and back fixed stops mounted on said support adapted to be engaged by said free corner, and actuating devices on opposite sides of said frame for applying a force, generally perpendicular to said frame, at a limited area of said frame between the sides connecting the three anchored corners to cause said free corner to move between stops with a snap movement in each direction.

5. In an electric snap switch, a support, a blade comprising a quadrilateral frame having comparatively stiff sides articulately connected at the corners of the frame and an interior body urging opposite sides together to cause said frame to tend to warp out of flatness, means on said support for anchoring three corners of said frame leaving the fourth corner free, front and back fixed contacts mounted on said support adapted to be engaged by said free corner, means for applying a biasing force to said frame to cause it normally to engage the back contact, a pushbutton mounted on said support for movement generally perpendicular to said frame against a limited area of said body between the sides connecting the three anchored corners to cause said free corner to disengage said back stop and engage said front stop with a snap movement.

6. In an electric snap switch, a support, a blade element comprising a quadrilateral frame having comparatively stiff sides articulately connected at the corners of the frame and an interior body urging opposite sides together to cause said frame to tend to warp out of flatness, means on said support for anchoring three corners of said frame leaving the fourth corner free, front and back fixed contacts mounted on said support adapted to be engaged by said free corner, pushbuttons, one on each side of said element, mounted on said support for movement generally perpendicular to said frame against a limited area of said body between the sides connecting the three anchored corners to cause said free corner to move between contacts with a snap movement in each direction.

7. In a displacement magnifying device, a four-sided frame-like member comprising a frame having interconnected, relatively stiff portions permitting relative angular movement therebetween, means for anchoring three of the corners of said frame on a support leaving the fourth corner free, means for providing tension between said relatively stiff portions to obtain over-centering action, means for applying spring action between said relatively stiff portions of such value as to cause the resistance to displacement of said free corner to be substantially zero over a substantial range of displacement, an actuating element applied to a point on said frame-like member having relatively small displacement, said free corner having relatively large displacement.

8. A movement producing device comprising a four-sided frame-like member having relatively stiff sides articulately connected at the corners of the frame, means for anchoring said frame at three corners thereof leaving the other corner free to move, fixed stops on opposite sides of said free corner, said frame-like member including an interior body under tension and tending to draw opposite sides together to cause said frame to tend to warp out of flatness, said body having one or more openings to increase flexibility, the area of said body between the two adjacent anchored sides being substantially continuous and constituting an actuating area, and an actuating member for exerting force on said actuating area to operate said free corner.

9. A movement producing device comprising a frame-like member having four corners and four relatively stiff sides articulately connected at the corners of the frame, anchors holding said frame at three corners thereof leaving the other corner free to move, fixed stops on opposite sides of said free corner, said frame-like member having one or more openings to increase the flexibility, an actuating member for exerting force on said frame-like member, and a support having portions passing through said openings for supporting said anchors and said stops.

10. A movement-producing device comprising a case having opposite walls, said case having three anchorage points and a fourth point with fixed stops, a quadrilateral frame-like member having relatively stiff sides articulately connected at the corners of the frame, three corners of said frame being mounted at said anchorage points leaving the fourth corner free to move between said fixed stops, one of said opposite walls having a guide, and a pushbutton in said guide adapted to engage said frame-like member.

11. A movement-producing device comprising a case having opposite walls, said case having three anchorage points and a fourth point with fixed stops, a quadrilateral frame-like member having relatively stiff sides articulately connected at the corners of the frame, three corners of said frame being mounted at said anchorage points leaving the fourth corner free to move between said fixed stops, said opposite walls having guides, and pushbuttons in said guides adapted to engage opposite faces of said frame-like member.

LINCOLN K. DAVIS.

REFERENCES CITED

The following references are of record in the file of this patent:

UNITED STATES PATENTS

| Number | Name | Date |
| --- | --- | --- |
| 1,849,481 | De Langie et al. | Mar. 15, 1932 |
| 1,939,286 | Spencer | Dec. 12, 1933 |
| 2,166,238 | Davis | July 18, 1939 |
| 2,202,440 | Beach | May 28, 1940 |
| 2,259,312 | Lee | Oct. 14, 1941 |
| 2,275,642 | Nordberg | Mar. 10, 1942 |
| 2,284,644 | Dubilier | June 2, 1942 |
| 2,332,883 | Abrahamson | Oct. 26, 1943 |
| 2,417,652 | Kunzler | Mar. 18, 1947 |